(12) United States Patent
Walker et al.

(10) Patent No.: US 6,341,268 B2
(45) Date of Patent: *Jan. 22, 2002

(54) SYSTEM AND METHOD PROVIDING A RESTAURANT MENU DYNAMICALLY GENERATED BASED ON REVENUE MANAGEMENT INFORMATION

(75) Inventors: Jay S. Walker, Ridgefield; Andrew S. Van Luchene, Norwalk; James A. Jorasch, Stamford, all of CT (US); Keith Bemer, New York, NY (US)

(73) Assignee: Walker Digital, LLC, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,220

(22) Filed: Dec. 23, 1998

(51) Int. Cl.[7] .............................................. G06F 17/60
(52) U.S. Cl. ......................................... 705/15; 705/400
(58) Field of Search ................................ 705/1, 15, 16, 705/20, 22, 400

(56) References Cited

U.S. PATENT DOCUMENTS

| 3,634,958 A | 1/1972 | Drowns ........................ 40/68 |
| 4,500,880 A | 2/1985 | Gommersall et al. .. 340/825.35 |
| 4,530,067 A | 7/1985 | Dorr ........................... 364/900 |
| 4,553,222 A | 11/1985 | Kurland et al. ............. 364/900 |
| 4,766,295 A | 8/1988 | Davis et al. .................. 235/383 |
| 4,972,318 A | 11/1990 | Brown et al. ................ 364/403 |
| 5,303,297 A | 4/1994 | Hillis ........................... 379/63 |
| 5,410,830 A | 5/1995 | Aiken, Sr. .................... 40/518 |
| 5,504,475 A | 4/1996 | Houdou et al. ........ 340/825.35 |
| 5,519,622 A | 5/1996 | Chasek .................. 364/464.04 |
| 5,572,653 A | 11/1996 | DeTemple et al. .......... 395/501 |
| 5,623,662 A * | 4/1997 | McIntosh .................... 707/204 |
| 5,758,329 A | 5/1998 | Wojcik et al. ................ 705/28 |
| 6,038,545 A * | 3/2000 | Mandeberg et al. .......... 705/15 |

FOREIGN PATENT DOCUMENTS

| JP | 10-49757 | * 11/1998 |
| WO | WO 99/62016 | * 12/1999 |

OTHER PUBLICATIONS

Anderson: "Seafood Strategies", Restaurant Business, Mar. 01, 1991, v90 n4, pp. 205–209.*
Shirley E. Kimes et al., "Restaurant Revenue Management: Applying Yielding Management to the Restaurant Industry", Cornell Hotel & Restaurant Quarterly, Jun. 1998 at p. 32.

* cited by examiner

Primary Examiner—Edward R. Cosimano
(74) Attorney, Agent, or Firm—Dean P. Alderucci

(57) ABSTRACT

A price associated with a menu item is automatically determined based at least partly on revenue management information. A request for a menu is received and a menu, including the automatically determined price, is generated in response to the request.

15 Claims, 12 Drawing Sheets

500

| PRODUCT IDENTIFIER 512 | STOCKED QUANTITY 514 | AVAILABLE QUANTITY 516 | CURRENT PRICE 518 |
|---|---|---|---|
| BLUE CRAB | 10 | 2 | $15.50 |
| FILET MIGNON | 10 | 2 | $17.75 |
| SWORDFISH | 15 | 12 | $15.95 |
| STEAK SANDWICH | 8 | 6 | $10.95 |
| APPLE PIE | 8 | 6 | $5.95 |
| BERRY PIE | 8 | 7 | $5.95 |
| CHEF SALAD | 8 | 8 | $7.50 |
| DINNER SALAD | 8 | 3 | $4.50 |
| SPARKLING WATER | 8 | 5 | $1.25 |
| WILD RICE | 15 | 2 | $4.60 |
| BAKED POTATO | 15 | 11 | $3.50 |
| HAMBURGER | 8 | 7 | $7.95 |

FIG. 3A

| PRODUCT IDENTIFIER 512 | EVALUATION FREQUENCY 528 | LAST EVALUATION DATE/TIME 530 | SALES SINCE LAST EVALUATION 532 | PREVIOUS DEMAND 534 | CURRENT DEMAND 536 | DEMAND INCREMENT 538 |
|---|---|---|---|---|---|---|
| BLUE CRAB | EVERY SALE | 2/2/98 7:00 | 0 | EVERY .3 HOURS | EVERY .3 HOURS | 10% |
| FILET MIGNON | EVERY SALE | 2/2/98 6:30 | 0 | EVERY .4 HOURS | EVERY .4 HOURS | 10% |
| SWORDFISH | EVERY 2 HOURS | 2/2/98 7:00 | 2 | EVERY 1 HOUR | EVERY .9 HOURS | 5% |
| STEAK SANDWICH | EVERY 2 HOURS | 2/2/98 6:00 | 1 | EVERY 1.4 HOURS | EVERY 1.2 HOURS | 15% |
| APPLE PIE | EVERY 3 HOURS | 2/2/98 5:00 | 6 | EVERY .5 HOURS | EVERY .5 HOURS | 15% |
| BERRY PIE | EVERY 3 HOURS | 2/2/98 5:25 | 9 | EVERY .6 HOURS | EVERY .3 HOURS | 15% |
| CHEF SALAD | EVERY 2 SALES | 2/2/98 7:12 | 0 | EVERY .3 HOURS | EVERY 3 HOURS | 15% |
| DINNER SALAD | EVERY 10 SALES | 2/1/98 7:15 | 5 | EVERY .7 HOURS | EVERY .8 HOURS | 15% |
| SPARKLING WATER | EVERY 2 SALES | 2/2/98 7:05 | 0 | EVERY 1 HOUR | EVERY 1.3 HOURS | 15% |
| WILD RICE | EVERY 72 HOURS | 2/2/98 8:00 | 1 | EVERY 2.6 DAYS | EVERY 2.1 DAYS | 5% |
| BAKED POTATO | EVERY 72 HOURS | 2/2/98 7:00 | 18 | EVERY 4 HOURS | EVERY 1.5 HOURS | 5% |
| HAMBURGER | EVERY 2 HOURS | 2/2/98 6:00 | 2 | EVERY 1.2 HOURS | EVERY .9 HOURS | 15% |

| PRODUCT IDENTIFIER 512 | PRICE ADJUSTMENT INCREMENT 540 | MINIMUM PRICE 542 | SUGGESTED PRICE 544 | MAXIMUM PRICE 546 |
|---|---|---|---|---|
| BLUE CRAB | $0.50 | $10.00 | $14.00 | $16.50 |
| FILET MIGNON | $0.50 | $11.50 | $15.00 | $18.00 |
| SWORDFISH | $0.50 | $11.00 | $12.50 | $16.00 |
| STEAK SANDWICH | $0.25 | $6.50 | $10.95 | $12.00 |
| APPLE PIE | $0.25 | $2.75 | $3.50 | $6.00 |
| BERRY PIE | $0.25 | $2.75 | $3.50 | $6.00 |
| CHEF SALAD | $0.25 | $4.00 | $5.00 | $7.50 |
| DINNER SALAD | $0.25 | $3.00 | $4.50 | $5.00 |
| SPARKLING WATER | $0.10 | $1.00 | $1.00 | $1.25 |
| WILD RICE | $0.25 | $2.00 | $3.00 | $4.75 |
| BAKED POTATO | $0.25 | $2.00 | $3.50 | $4.00 |
| HAMBURGER | $0.50 | $4.50 | $7.00 | $8.00 |

FIG. 3C

| NAME 602 | MENU # 604 | DAY/DATE OF LAST VISIT 606 | FREQUENT CUSTOMER ID # 608 | ADDRESS 610 | PHONE NUMBER 612 | TOTAL NUMBER OF VISITS 614 | AVERAGE TIME OF DAY PER VISIT 616 |
|---|---|---|---|---|---|---|---|
| JOHN SMITH | 123 | 2/2/98 | 56789 | 1 MAIN ST. ANYTOWN, USA | (111) 111-1111 | 4 | 8:15 PM |
| GORDON LITTLETON | 134 | 2/5/98 | 45678 | 20 OAK ANYTOWN, USA | (111) 112-1112 | 5 | 8:38 PM |
| KARY TRITON | 156 | 2/3/98 | 34567 | 300 KING DR. ANYTOWN, USA | (111) 113-1113 | 23 | 7:25 PM |
| JIM BUFF | 167 | 2/2/98 | 23456 | 4000 BOB ST. ANYTOWN, USA | (111) 111-1114 | 7 | 5:13 PM |
| ELIZABETH JOHNSON | 178 | 2/7/98 | 12345 | 5 FIRST PL. ANYTOWN, USA | (111) 115-1115 | 11 | 7:00 PM |

← 701

| MENU # 134 2/2/98 | # IN PARTY: 2 | | TABLE # 12 ARRIVAL: 7:15 PM 702 |
|---|---|---|---|
| ITEM # 704 | ITEM 706 | PRICE 708 | ITEM CLASS 710 |
| 2468 | PRIME RIB PLATTER | $15.95 | MEAT / MAIN |
| 2458 | SWORDFISH DELIGHT | $16.50 | FISH / MAIN |
| 2448 | BUFFALO WINGS | $4.50 | APPETIZER |
| 2438 | CHEESECAKE | $7.95 | DESSERT |

SYSTEM AND METHOD PROVIDING A RESTAURANT MENU DYNAMICALLY GENERATED BASED ON REVENUE MANAGEMENT INFORMATION

FIELD OF THE INVENTION

The present invention relates to restaurant menus. In particular, the present invention relates to a restaurant menu dynamically generated based on revenue management information.

BACKGROUND OF THE INVENTION

Typically, a restaurant, such as a sit down restaurant, gives each customer a menu listing a number of items and associated prices. Menu items can include, for example, appetizers, salads, main dishes and drinks. The menus are pre-printed and every customer that visits the restaurant receives an identical menu. The price of each item on the menu is determined by the restaurant based on, for example, the expected food costs associated with the item and the expected popularity of the item.

Because of the time required to select menu items and to determine appropriate prices, a restaurant generally updates its menu infrequently, such as once per season or even once per year. In addition to the time required to update the menu, a restaurant may need to train employees and reconfigure automated order-taking devices with respect to new items on the menu and/or new prices.

As a result of being updated so infrequently, a restaurant menu does not take advantage of current revenue management information. For example, an item may currently be more popular, that is, in higher "demand," than predicted, and therefore the item's price on the pre-printed menu will be too low. Likewise, an item may turn out to be less popular and have a price that is too high. In either case, the restaurant may not be making as much profit as it could.

In addition to an item's popularity, the amounts of various ingredients currently available in the kitchen's pantry, or the restaurant's "supply" or "inventory," are not typically used to adjust prices on a pre-printed menu. For example, a restaurant may have an unusually large number of steaks in the pantry. In this case, the restaurant may lose money if some of the steaks are not sold and are ultimately discarded. It may be preferable to slightly reduce the price of some items on the menu, if more efficient use of the restaurant's inventory is made.

To solve this problem, a restaurant may introduce a number of weekly, or even daily, items, or "specials," selected to efficiently use current inventory. Such specials may be orally presented by a server, hand written on a display board or included on a small piece of paper attached to the regular pre-printed menu. This approach, however, is only of limited use because a relatively small number of specials can realistically be offered. Moreover, the specials do not change the price of existing items on the menu.

In addition to not dynamically adjusting prices on a menu, a restaurant does not dynamically adjust which items are included on a menu. For example, when a restaurant temporarily runs out of a particular item, customers may still attempt to order the item only to be told that the item is not available. This may frustrate customers and complicate the order taking process.

Even if a menu could be generated on a dynamic basis to reflect, for example, the current supply and demand of various items on the menu, problems would arise when calculating a bill for a particular customer. For example, if each customer's menu had a unique set of menu items and/or prices, a server may need to manually calculate a bill for each customer based on the particular order and the particular set of prices on that menu.

Moreover, dynamically generating prices on a menu could upset some customers. For example, a customer that frequently visits a restaurant may prefer that his or her favorite item always has the same price. On the other hand, customers that do not frequently visit the restaurant, and who therefor are not familiar with the "usual" prices for items on the menu, may have no such problem. Similarly, a restaurant may want to consider the needs of a frequent customer, such as a customer that orders a steak dinner every Friday at 7:00 p.m., when determining whether the current inventory justifies including an item on a non-frequent customer's menu.

In addition to a pre-printed "general" menu, a restaurant may also have, for example, a pre-printed dessert menu and/or a pre-printed child's menu. These menus have the same limitations discussed about the respect to general menus.

U.S. Pat. No. 4,553,222 to Kurland et al. discloses an integrated restaurant communication system that dynamically updates a menu displayed on a video monitor. The menu can be updated, for example, at a manager's discretion. The Kurland patent does not address the automated use of supply and demand information to dynamically adjust items and prices on a restaurant menu.

U.S. Pat. No. 4,530,067 to Dorr discloses a restaurant management information and control system. A central processor computes restaurant management information, such as the popularity of items on the menu and the current inventory of the restaurant. The Dorr patent does not disclose that this information could be used to dynamically adjust items and prices on the restaurant's menu.

SUMMARY OF THE INVENTION

To alleviate the problems inherent in the prior art, the present invention introduces systems and methods that provide a restaurant menu dynamically generated based on revenue management information.

In one embodiment of the present invention, a price associated with a menu item is automatically determined based at least partly on revenue management information. A request for a menu is received and a menu, including the automatically determined price, is generated in response to the request.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIGS. 3A to 3C are tabular representations of the price management table database shown in FIG. 2 according to an embodiment of the present invention.

FIG. 5 is a tabular representation of the menu database shown in FIG. 2 according to an embodiment of the present invention.

DETAILED DESCRIPTION

The present invention is directed to systems and methods that provide a restaurant menu that is dynamically generated based on revenue management information. As a contextual example of the present invention, consider a customer that enters a restaurant. According to one embodiment of the present invention, an employee requests a menu for that customer, and a menu is printed out in response to the request. If a group of customers enter the restaurant, the number of people in the party can be used to "automatically" generate enough menus for the group. As used herein, the terms "automatic" and "automatically" refer to actions that are not performed in an entirely manual way.

According to an embodiment of the present invention, the prices of items on the menu, as well as which items are included on the menu, may be automatically and "dynamically" determined based at least partly on revenue management information, such as the supply of and demand for various items on the menu. As used herein, the terms "dynamic" and "dynamically" refer to actions that are performed in substantially real-time. A code, such as a "table" based code or a "menu" based code, associated with the prices on a particular menu is also generated. The table or menu code can then be used when the customer places an order to automatically calculate the correct price for an ordered item.

Note that a table code could be generated by the system at different points during a customer's visit. It could be generated when the number of menus is entered and the menu code is generated, when the customer is taken to a table, when an order is taken, etc. A physical table in the restaurant can always have the same table code, or a different table code can be generated for each customer.

Another embodiment of the present invention provides a system that customizes a menu for a frequent customer. This could be done, for example, by having the customer swipe a card with a magnetic stripe through a reader. A visual recognition machine, or even an employee, could instead identify frequent customers. Standard prices and/or the frequent customer's favorite menu items could then be used to generate a customized menu. The items ordered by the frequent customer and/or the prices paid for those items can also be stored in a frequent customer database for future use.

Figure 1:
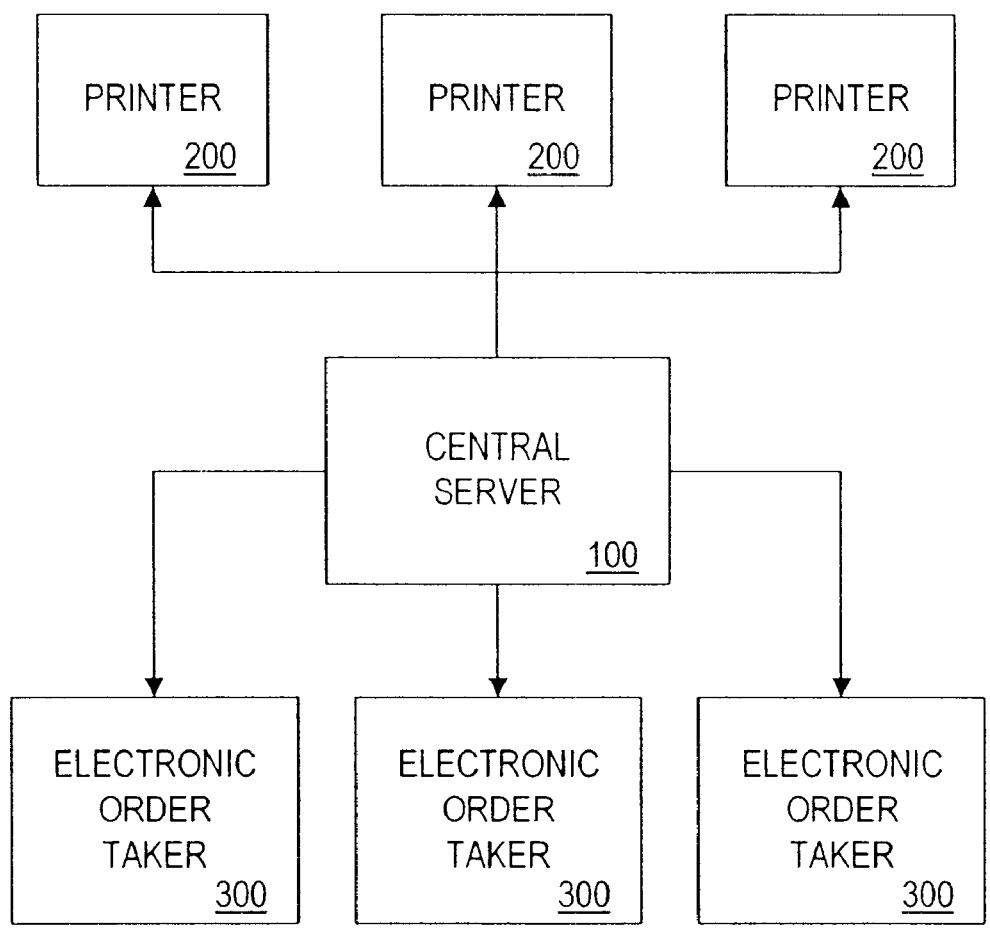
FIG. 1 is a block diagram overview of a system that provides a restaurant menu dynamically generated based on revenue management information according to an embodiment of the present invention.

Turning now in detail to the drawings, FIG. 1 is a block diagram overview of a system that provides a restaurant menu dynamically generated based on revenue management information according to an embodiment of the present invention. The system includes a central server 100 coupled to a number of printers 200 and electronic order takers 300.

According to an embodiment of the present invention, the central server 100 automatically and dynamically determines a price associated with an item to be included on a menu based at least partly on revenue management information. For example, the central server 100 may initially assign a predetermined, or "default" price to an item and periodically adjust the item's price based at least partly on the revenue management information.

The revenue management information may comprise, for example, information related to the current demand for, or previous sales of, the item. For example, the revenue management information could reflect the number of items that have been sold over a given period of time. That is, if steak is being sold at an unusually quick pace, the price of the steak on the menu may be slightly increased.

The revenue management information may also comprise, for example, information related to the current supply, or inventory, of the item. For example, the revenue management information could reflect the number of items that are currently in the kitchen's pantry. According to another embodiment of the present invention, the inventory may also reflect a predicted amount of inventory, an age of inventory or a price paid for inventory. For example, if a supply of steaks is nearing the end of its useful life, or if the steaks had been purchased at an unusually inexpensive price, the revenue management information may be used to decrease the price of related items on the menu.

The revenue management information may simply reflect the current supply and demand, or may instead take "historical" information into account, such as previous information related to particular days, time-of-days, day-of-weeks or month-of-years. For example, if sales of steak traditionally peak during Friday evenings in the winter, prices on the menu could be automatically and dynamically adjusted accordingly.

According to an embodiment of the present invention, after the central server 100 automatically and dynamically determines a price associated with an item to be included on the menu, one or more menus are generated in response to a request, such as a request by a restaurant employee. The generated menu can then be, by way of example, displayed on a video monitor or printed by one of the printers 200. If the number of people in a particular party is included with the request for a menu, the system can automatically print the proper number of menus.

According to another embodiment of the present invention, each unique menu, including the set of items and associated prices on that menu, is assigned a "table" code. A customer's order, including the table code, can then be entered, such as by an employee of the restaurant or a customer, into the system using, for example, a hand held communication device, a voice recognition device or any other electronic order taker 300. The electronic order taker 300 sends the order information to the central server 100, and the system calculates the correct prices for the items that were ordered.

According to still another embodiment of the present invention, prices and/or items on the menu can also be based at least partly on information related to a customer associated with the request for the menu. For example, a card reading machine, a visual recognition unit or a manual input device may be used to identify a frequent customer. The central server 100 may then, for example, automatically select the frequent customer's favorite items to be included on the menu. The central server 100 may also, if desired, use a fixed set of prices, instead of dynamically generated prices, for the frequent customer. Information about frequent customers can also comprise part of the inventory information used to generate menus. For example, if a frequent customer always orders steak at 7:30 p.m. on Friday, the system can "reserve" one steak for that customer. Similarly, the average number of steaks ordered in a predetermined time period may be used to determine a number of steaks that are reserved. Furthermore, steaks may be omitted from the menus provided to nonfrequent customers. A special discount, such as a discount that increases based on the amount of money spent by a customer, can also be used by the central server 100 to generate a menu or calculate a bill.

In addition to a "general" menu, the system may similarly generate "supplemental" menus for a customer according to another embodiment of the present invention. For example, the system may generate a dessert menu and/or a child's menu for the customer. As with the general menu, a dynamically generated supplemental menu may contain automatically determined prices based at least in part on revenue management information.

Figure 2:
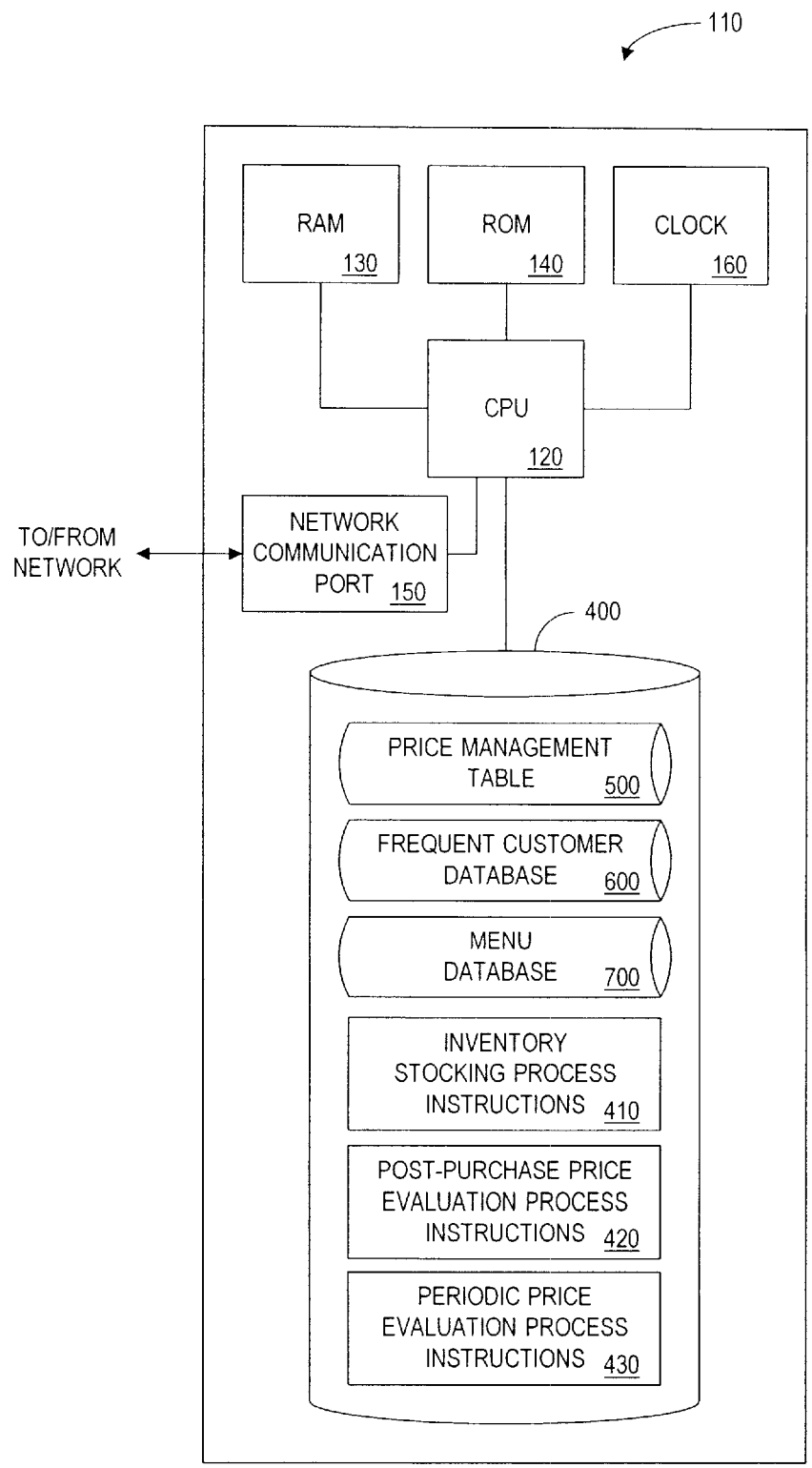
FIG. 2 is a block diagram of a processing module for the central server shown in FIG. 1 according to an embodiment of the present invention.

FIG. 2 is a block schematic diagram of a processing module 110 for the central server 100 shown in FIG. 1 according to an embodiment of the present invention. The processing module 110 includes a Central Processing Unit (CPU) 120 coupled to: a clock 160; a network communication port 150, which in turn is coupled to a network (not shown in FIG. 2); and "memories" comprising a Random Access Memory (RAM) 130 and a Read Only Memory (ROM) 140. A storage device 400 is also coupled to the CPU 120.

The memories 130, 140 and/or the storage device 400 may store instructions adapted to be executed by the CPU 120 to perform at least one embodiment of the method of the present invention. For example, the memories 130, 140 and the storage device 400 can store instructions adapted to be executed by CPU 120 to automatically determine a price associated with an item included on a menu based at least partly on revenue management information, and to generate a menu in response to a request received by the network communication port 150.

For the purposes of this application, the memories 130, 140 and storage device 400 could include any medium capable of storing instructions adapted to be executed by a processor. Some examples of such media include, but are not limited to, floppy disks, CD-ROM, magnetic tape, hard drives, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

As shown in FIG. 2, the storage device 400 contains a price management table database 500, which is described in detail with respect to FIGS. 3A to 3C. The storage device 400 also contains a frequent customer database 600, which is described in detail with respect to FIG. 4, and a menu database 700, which is described in detail with respect to FIG. 5.

The storage device 400 may also contain inventory stocking process instructions 410 which can be used to have the CPU 120, for example, update current inventory based on orders and to automatically place orders for inventory based on current inventory. Post-purchase price evaluation process instructions 420 may be used to have the CPU 120 evaluate prices after a purchase is made, and periodic price evaluation process instructions 430 may be used to have the CPU periodically evaluate prices, such as in response to information from the clock 160.

FIGS. 3A to 3C are tabular representations of the price management table database 500 shown in FIG. 2 according to an embodiment of the present invention. As shown in FIGS. 3A to 3C, the price management table database 500 has multiple data categories. For example, in FIG. 3A the table includes a product identifier 512, a stocked quantity 514, an available quantity 516 and a current price 518. For example, there are 15 units of swordfish currently stocked. Twelve of those are "available," i.e. not reserved for another purpose such as an expected frequent customer, and the current price is $15.95.

As shown in FIG. 3B, the price management table database 500 also includes an evaluation frequency 528, a last evaluation date/time 530, a sales since last evaluation 532, a previous demand 534, a current demand 536 and a demand increment 538. For example, the swordfish item is evaluated every two hours, and was last evaluated at 7:00. Two sales have occurred since the last evaluation. Demand for the swordfish item was previously every 1.0 hour, and is currently every 0.9 hour. That is, the demand has slightly increased because the item is being ordered more frequently. The swordfish has a demand increment of 5%, which can be used to adjust the price of the swordfish menu item, if desired.

As shown in FIG. 3C, the price management table database 500 further includes a price adjustment increment 540, a minimum price 542, a suggested price 544 and a maximum price 546. For example, swordfish has a suggested, or "default," price of $12.50, but can vary from between $11.00 and $16.00 by $0.50 increments.

The use of the price management table database 500 according to an embodiment of the present invention will now be described. The suggested price 544 can initially be based on, for example, historical data from the preceding day, the preceding week, or the preceding day of week. The current price 518 may be based on, for example, the number of items sold since the last evaluation 532. That is, if an item is selling well, the price increases. The current price 518 may instead be based on, for example, the sales of an item per time unit. According to one embodiment of the present invention, an item is assigned a specific price for every range of sale per time unit (i.e. <5 items/hour=$2.00, 5 items/hour=$2.25, and >5 items/hour=$2.50). This may be done, for example, using the current demand 536 of the item.

According to another embodiment of the present invention, the current price 518 may instead be incrementally adjusted, such as by a demand increment 538, based on the sales of an item per unit time. For example, each item may have an incremental adjustment that is fixed for ranges of sales per unit time (i.e. <5 items/hour=$0.25, 5 items/hour=no change, and >5 items/hour=+$0.25).

According to other embodiments of the present invention, the current price 518 may be based on the amount of inventory, such as the stocked quantity 514 or available quantity 516; the rate of sale for an item compared to the rate of sales for other items; the change in sales per unit time, i.e., the current demand 536 as compared to the previous demand 534; or the age of the product, in which case the price may decrease as the item ages.

Figure 4:
FIG. 4 is a tabular representation of the frequent customer database shown in FIG. 2 according to an embodiment of the present invention.

FIG. 4 is a tabular representation of the frequent customer database 600 shown in FIG. 2 according to an embodiment of the present invention. As shown in FIG. 4, the frequent customer database 600 includes a name 602, a menu number 604, a day/date of last visit 606, a frequent customer identification number 608, an address 610, a phone number 612, a total number of visits 614 and an average time of day per visit 616.

According to another embodiment of the present invention, the restaurant reserves, if possible, sufficient inventory to handle the needs of frequent customers. For this purpose, the frequent customer database 600 may be expanded to include this type of historical information. By way of example, suppose a customer usually comes in at 7:00 p.m. and orders a steak. After only one steak is left at 6:00 p.m., the steak item may be excluded from the menus of non-frequent customers. If the frequent customer does not arrive by 7:00 p.m., the steak item may again appear on the menus of non-frequent customers.

FIG. 5 is a tabular representation of a record 701 of the menu database 700 shown in FIG. 2 according to an embodiment of the present invention. The menu database 700 would typically include a record for each menu generated. As shown in FIG. 5, the record 701 includes a menu header 702 for the menu, such as a header indicating a menu number, a number of people in the party, the date the menu was generated, a table number and the time the menu was generated. Each menu also includes an entry for a number of menu items, including an item number 704, an item name 706, an item price 708 and an item class 710.

Figure 6A:
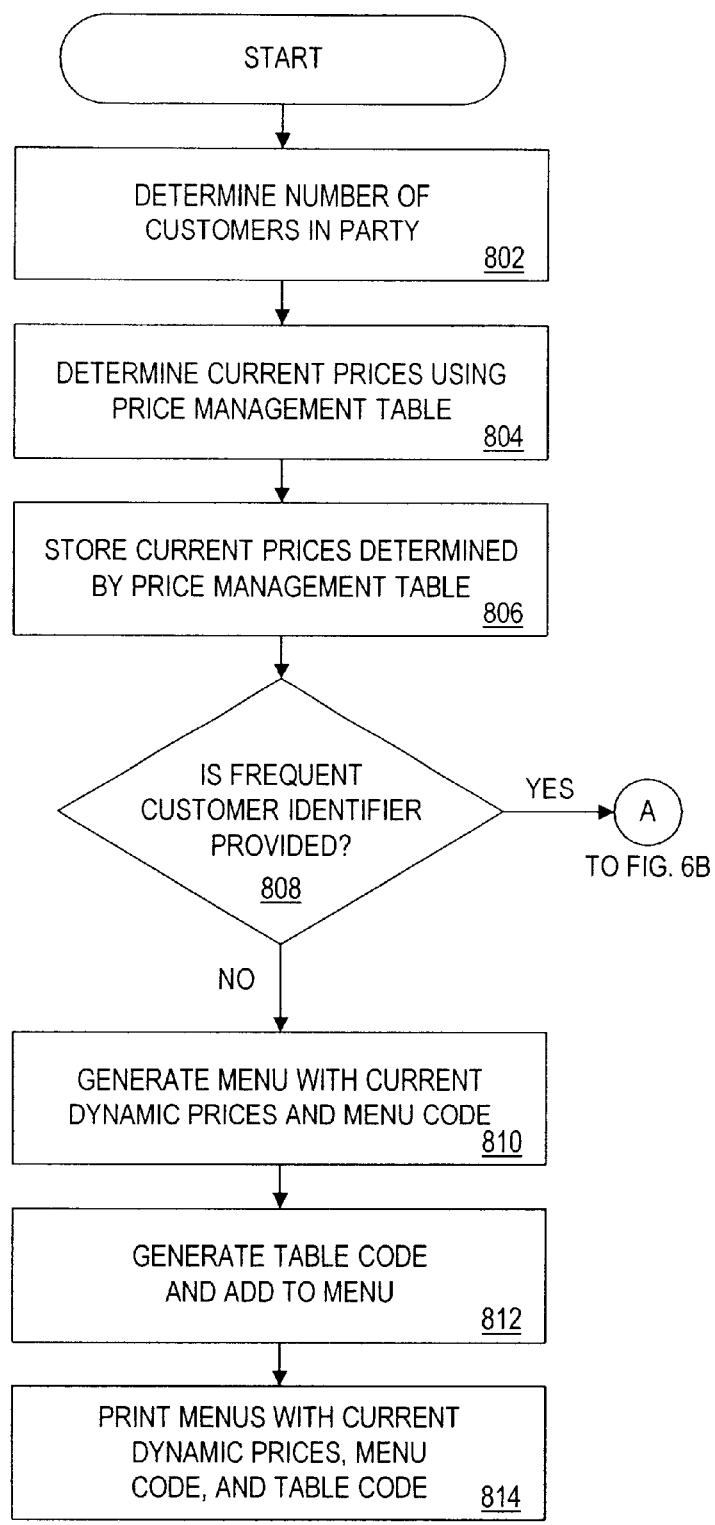
FIGS. 6A and 6B are flow charts illustrating a method of generating a revenue managed menu in a sit-down restaurant environment according to an embodiment of the present invention.
Figure 6B:
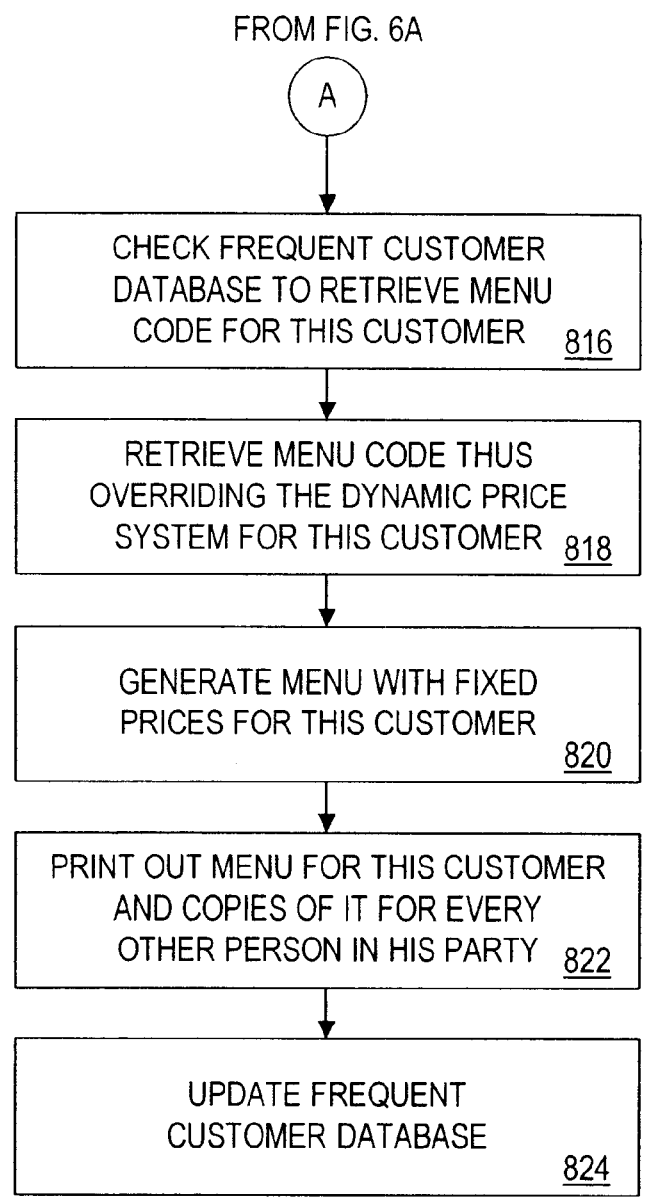

FIGS. 6A and 6B are flow charts illustrating a method of generating a revenue managed menu in a sit-down restaurant environment according to an embodiment of the present invention. The flow charts in FIGS. 6A and 6B, as well as the other flow charts discussed herein, are not meant to imply a fixed order to the steps; an embodiment of the present invention can be practiced in any order that is practicable.

As shown in FIG. 6A, at step 802 the number of customers in a party is determined. At step 804, the current prices are determined using a price management table database, such as the price management table database shown in FIGS. 3A to 3C. The current prices determined by the price management database are stored at step 806.

If a frequent customer identifier is provided at step 808, the steps shown in FIG. 6B are performed. If a frequent customer identifier is not provided at step 808, a menu with current dynamic prices is generated along with a menu code at step 810. A table code is generated and added to the menu at step 812. Menus with current dynamic prices, a menu code and a table code are printed at step 814.

As shown in FIG. 6B, the frequent customer database, shown in FIG. 4, is checked to retrieve a menu code for the customer at step 816. At step 818, the menu code is used to over-ride the dynamic price system for the frequent customer and a menu with fixed prices is generated at step 820. The menu is printed for the frequent customer at step 822, including enough copies for all members in the party, and the frequent customer database is updated at step 824.

According to one embodiment of the present invention, the system may customize menus for frequent customers in a number of ways. The prices for items on these menus may be constant for the items that the frequent customer usually orders, but the rest of the prices may change dynamically. If the customer does not order the same items consistently, then all the prices could remain the same as the ones on his or her last menu. There could also be a "regular menu" which lists static prices for all frequent customers, enabling the system to have a more limited frequent customer database (because all frequent customers would receive the same menu).

According to another embodiment of the present invention, the system simply uses an over-ride function for frequent customers such that a menu is printed with default prices rather than with prices that have been adjusted based on revenue management information. For example, the system may use predetermined "default" prices. This function could be initiated by an employee upon recognition of a customer, or a frequent customer can be recognized by a frequent customer "card," a credit card or a smart card used each time the customer visits the restaurant. Another frequent customer embodiment uses a progressive discount function that gives a customer increased benefits as the number of visits to, or the amount of money spent at, the restaurant increases. A frequent customer's name and orders may be recorded in the frequent customer database for future use.

Figure 7A:
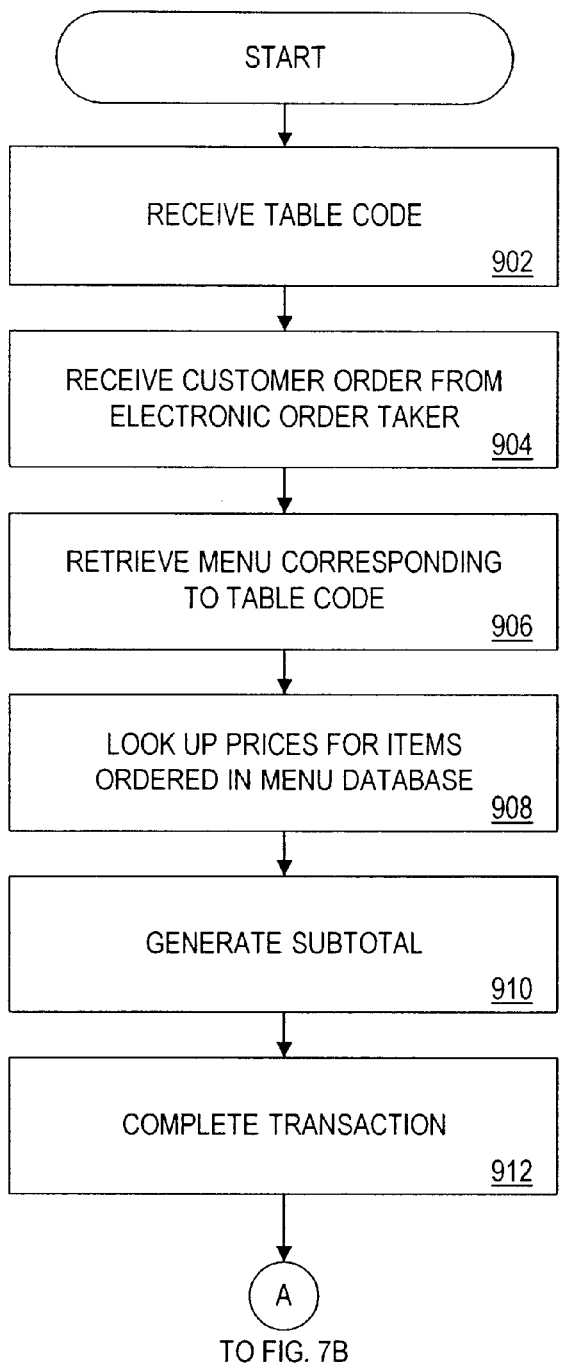
FIGS. 7A and 7B are flow charts illustrating a method of receiving and processing orders according to an embodiment of the present invention.
Figure 7B:
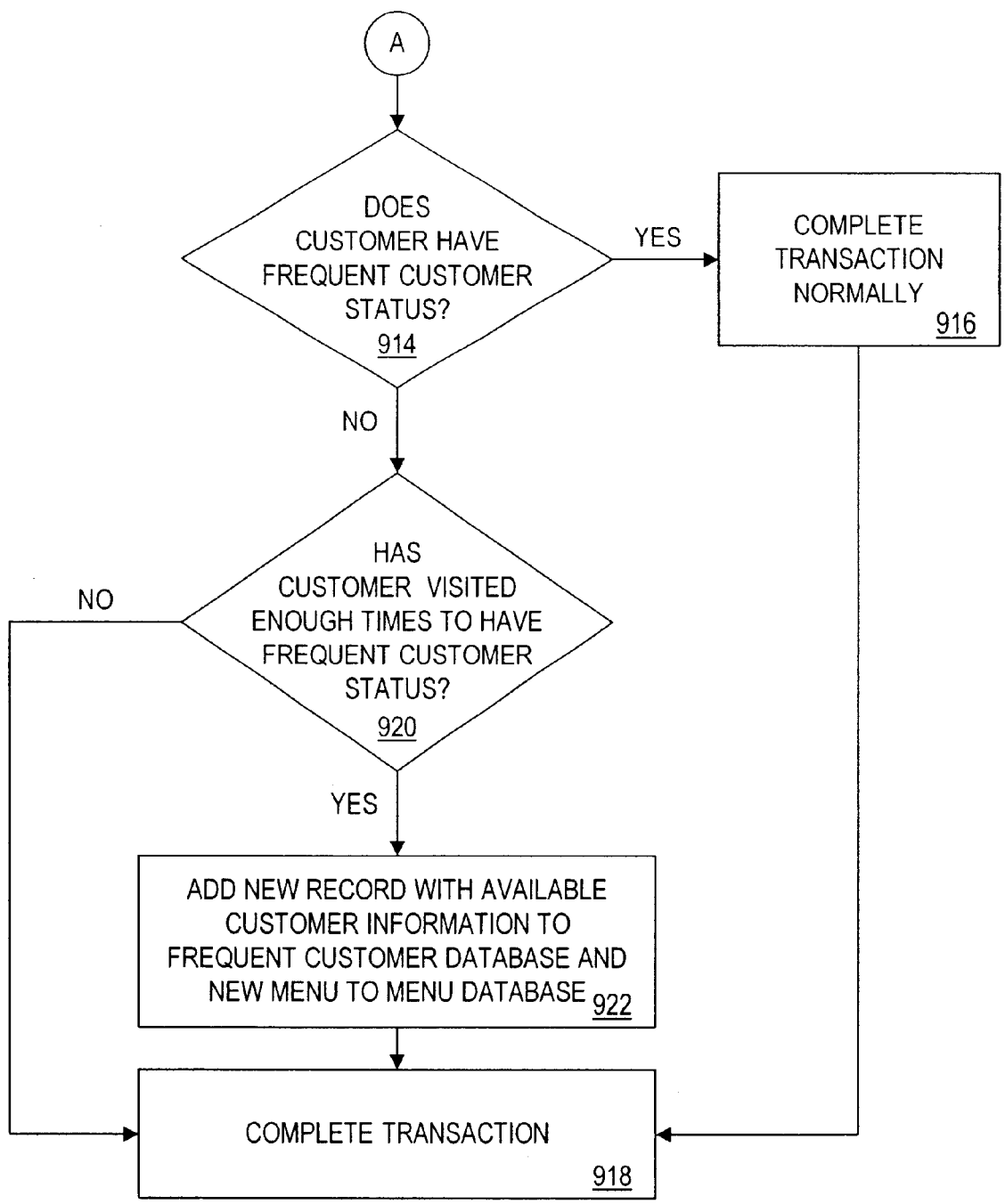

FIGS. 7A and 7B are flow charts illustrating a method of receiving and processing orders according to an embodiment of the present invention. As shown in FIG. 7A, at step 902 a table code is received and a customer order is received from an electronic order-taker at step 904. At step 906, the menu corresponding to the table code is retrieved. At step 908 the process performs a look-up in the menu database to determine prices for the ordered items and used to generate a subtotal at step 910 before the transaction is completed as indicated by step 912 and FIG. 7B.

In other words, each order that is made by an ordering party is correlated to a menu code that corresponds to the menu from which the order was made. According to one embodiment of the present invention, when a bill is requested the server enters the items ordered and the menu code (or table code) into, for example, an automated cash register. The system uses the menu code to look up the prices associated with the items ordered. A total is then calculated using those prices. Note that either a menu number, table number or any other code can be used to associate an ordered item with an appropriate price.

As shown in FIG. 7B, if a customer already has frequent customer status at step 914, the transaction is completed normally as indicated at steps 916 and 918. If a customer does not have frequent customer status at step 914, it is determined if the customer has now visited the restaurant enough times to be entitled to frequent customer status at step 920. If not, the transaction is completed normally at step 918. If, on the other hand, the customer is entitled to frequent customer status at step 920, a new record with available customer information is added to the frequent customer database and a new menu is added to the menu database at step 922 before the transaction is completed at step 918.

Figure 8:
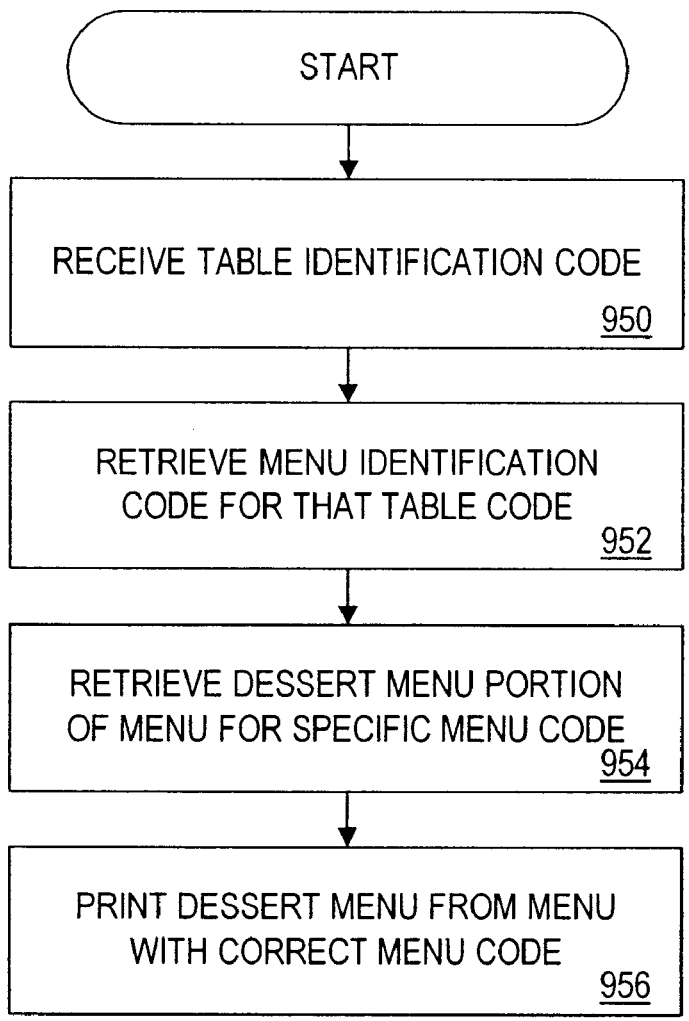
FIG. 8 is a flow chart illustrating a method of generating a desert menu according to an embodiment of the present invention.

FIG. 8 is a flow chart illustrating a method of generating a dessert menu according to an embodiment of the present invention. At step 950 a table identification code is received.

The menu identification code associated with the received table code is retrieved at step 952. The dessert menu portion of the menu associated with a specific menu code is retrieved at step 954 and the dessert menu is printed from the appropriate menu at step 956. If desired, a dessert menu could be printed on the original menu. According to an embodiment of the present invention, the prices listed for desserts may be the same as the prices on the original menu. In this case, the code may be stored with the menu code and retrieved when the customer wants to order dessert. For example, when an employee needs to retrieve a dessert menu from a specific menu code, he or she enters the menu code into the system and the prices for the desserts listed for that code are automatically printed on a new menu. If dessert is not included on the original menu, a dessert menu can be generated and printed in the same way as the original menu.

Similar to the dessert menu, a child's menu may be printed separately from the general menu upon request. The number of child's menus to be generated can be based on, for example, the number of children in the party. The child's menus may be included in the general menu, in which case a menu may or may not be printed for the child, as desired. Similarly, any other supplemental menu (e.g. a dessert menu) may be included in a general menu.

Thus, the present invention lets a restaurant adjust prices in substantially real-time based on revenue management information, such as supply and demand. This can reduce waste associated with less popular menu items and enhance profits associated with more popular, items.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for dynamically generating a menu, comprising:

(a) automatically determining a price associated with a menu item based at least partly on revenue management information;

(b) receiving a request for a menu; and (c) generating a menu, including the automatically determined price, in response to the request for a menu;
    wherein the automatically determined price associated with the menu item is further based at least partly on information related to a customer associated with the request for a menu.

2. The method of claim 1, wherein the information related to the customer is received from at least one of a card reading machine, a visual recognition unit and a manual input device.

3. The method of claim 1, comprising the further step of:

(d) automatically selecting menu items based at least partly on the information related to the customer.

4. The method of claim 1, wherein said step of automatically determining a price further comprises the step of adjusting the price associated with a menu item based on information related to the customer.

5. The method of claim 1, wherein the information related to the customer comprises at least one of (i) an indication that the customer is a frequent customer and (ii) information about past menu items ordered by the customer.

6. The method of claim 5, wherein the automatically determined price is not included on the generated menu based on the information about past menu items ordered by the customer.

7. The method of claim 5, wherein an item is not included on a menu generated for a second customer based on the information about past menu items ordered by the customer.

8. A menu generating system, comprising:

(a) a first port adapted to receive a request for a menu;

(b) a storage device storing information associated with a price management table, the price management table comprising prices associated with menu items;

(c) a processor coupled to said first port and said storage device, said processor being configured to: receive the request for a menu;

generate information associated with a menu: and dynamically update prices stored in said storage device based at least partly on revenue management information; and (d) a second port coupled to said processor, said second port being adapted to output the information associated with a menu;
    wherein said processor is configured to dynamically update prices stored in said storage device based at least partly on information related to a customer associated with the request for a menu.

9. The system of claim 8, further comprising:

(e) a customer input device coupled to said processor and configured to provide the information related to the customer, said customer input device comprising at least one of a card reading machine, a visual recognition unit and a manual input device.

10. The system of claim 8, wherein said processor is further configured to automatically select menu items based at least partly on the information related to the customer.

11. The system of claim 8, wherein said processor automatically determines a price by reducing the price associated with a menu item based on information related to the customer.

12. The system of claim 8, wherein the information related to the customer comprises at least one of (i) an indication that the customer is a frequent customer and (ii) information about past menu items ordered by the customer.

13. The system of claim 12, wherein said processor does not use the automatically determined for some menu items based on the information about past menu items ordered by the customer.

14. The system of claim 12, wherein said processor is further configured to not include a menu item in the information generated associated with a second menu based on the information about past menu items ordered by the customer.

15. A method for determining a price associated with an order, comprising:

(a) automatically determining a price associated with a menu item based at least partly on revenue management information;

(b) receiving a request for a menu;

(c) generating a menu, including the automatically determined price, in response to the request for a menu;

(d) assigning a menu code to the generated menu;

(e) receiving an order for the menu item, the order including the menu code; and (f) calculating a price associated with the order, using the menu code, based at least partly on the automatically determined price associated with the menu item.

* * * * *